(12) United States Patent
Onezawa et al.

(10) Patent No.: US 12,046,424 B2
(45) Date of Patent: Jul. 23, 2024

(54) AIRTIGHT TERMINAL

(71) Applicant: Schott Japan Corporation, Koka (JP)

(72) Inventors: Yutaka Onezawa, Koka (JP); Naoki Bokuda, Koka (JP)

(73) Assignee: Schott Japan Corporation, Koka (JP)

( * ) Notice: Subject to any disclaimer, the term of this patent is extended or adjusted under 35 U.S.C. 154(b) by 595 days.

(21) Appl. No.: 17/264,765

(22) PCT Filed: Jul. 30, 2019

(86) PCT No.: PCT/JP2019/029798
§ 371 (c)(1),
(2) Date: Jan. 29, 2021

(87) PCT Pub. No.: WO2020/027114
PCT Pub. Date: Feb. 6, 2020

(65) Prior Publication Data
US 2021/0296053 A1    Sep. 23, 2021

(30) Foreign Application Priority Data
Aug. 1, 2018 (JP) ................. 2018-144659

(51) Int. Cl.
*H01G 9/10* (2006.01)
*H01G 9/00* (2006.01)
*H01G 9/008* (2006.01)

(52) U.S. Cl.
CPC ............ *H01G 9/10* (2013.01); *H01G 9/0032* (2013.01); *H01G 9/008* (2013.01)

(58) Field of Classification Search
CPC ....................................... H01G 9/10
See application file for complete search history.

(56) References Cited

U.S. PATENT DOCUMENTS

| | | |
|---|---|---|
| 2010/0021811 A1 | 1/2010 | Kado et al. |
| 2010/0129709 A1 | 5/2010 | Matsubara |
| 2014/0356701 A1 | 12/2014 | Gong et al. |

(Continued)

FOREIGN PATENT DOCUMENTS

| | | |
|---|---|---|
| CN | 102651461 A | 8/2012 |
| JP | S52124450 U | 9/1977 |

(Continued)

OTHER PUBLICATIONS

[English Translation] Notice of Rejection dated Apr. 20, 2023 in the KR Application No. 10-2021-7005218; pp. all.

(Continued)

*Primary Examiner* — Hung V Ngo
(74) *Attorney, Agent, or Firm* — Dorsey & Whitney LLP

(57) ABSTRACT

Provided is an airtight terminal that is designed to enable implementation of a method for sealing a can case with the airtight terminal with improved readiness and at a reasonable price, as well as an electrical device package and a method for manufacturing an electrical device package. Provided is an airtight terminal that includes a lid composed of a dish-shaped thin metal sheet having a through hole in a surface of the sheet, a lead passing through the through hole in the lid, and an insulating material to hermetically seal a gap between the lead and the lid, wherein the lid has an engagement portion along an edge of the lid to seal a can case by seaming.

36 Claims, 5 Drawing Sheets

(56) References Cited

U.S. PATENT DOCUMENTS

| | | | |
|---|---|---|---|
| 2017/0222195 A1 | 8/2017 | Hartl | |
| 2018/0151300 A1 | 5/2018 | Honda et al. | |

FOREIGN PATENT DOCUMENTS

| | | | |
|---|---|---|---|
| JP | S55117864 A | | 9/1980 |
| JP | S5726842 U | | 2/1982 |
| JP | S5812257 A | | 1/1983 |
| JP | S58125817 A | | 7/1983 |
| JP | S61152550 A | | 7/1986 |
| JP | S61132237 U | | 8/1986 |
| JP | S61137526 U | | 8/1986 |
| JP | S61230312 A | | 10/1986 |
| JP | H06179428 A | | 6/1994 |
| JP | 3724028 | * | 12/2005 |
| JP | 2007250413 A | | 9/2007 |
| JP | 2009010237 A | | 1/2009 |
| JP | 2010055961 A | | 3/2010 |
| JP | 2011228409 A | | 11/2011 |
| JP | 2018502417 A | | 1/2018 |
| KR | 20100061358 A | | 6/2010 |
| KR | 20180015664 A | | 2/2018 |
| WO | 2016195027 A1 | | 12/2016 |

OTHER PUBLICATIONS

Partial European Search Report dated Apr. 28, 2023 in the EP Application No. 23151483.7; pp. all.
[English Translation] Decision of Refusal mailed on Jan. 14, 2022 for Japanese Patent Application No. 2018-144659; pp all.
[English Translation] Notice of Reasons for Refusal mailed on Nov. 24, 2021 for Chinese Patent Application No. 201980051404.4.
English translation of International Preliminary Report on Patentability received in PCT/JP2019/029798 dated Feb. 2, 2021.
English translation of International Search Report and Written Opinion for Application No. PCT/JP2019/029798, mailed Oct. 15, 2019.
[English Translation] Office Action dated Oct. 28, 2022 in KR application No. 10-2021-7005218; pp. all.
[English Translation] Second Office Action dated Oct. 21, 2022 in CN application No. 201980051404.4; pp. all.
[English Translation] Reconsideration Report by Examiner before Appeal dated Jun. 27, 2022 for Japanese Patent Application No. 2018-144659; pp. all.
Extended European Search Report dated Jun. 15, 2022 for European Patent Application No. 19845151.0; pp. all.
Office Action mailed Jan. 17, 2023 in JP Application No. 2018-144659; pp. all.
[English Translation] Communication pursuant to Rule 164(1) EPC dated Mar. 14. 2022 for European Patent Application No. 19845151.0.
[English Translation] Notice of Reason for Refusal dated Apr. 19, 2022 for Korean Patent Application No. 10-2021-7005218.
[English Translation] Notice of Reasons for Refusal, dated Jun. 21, 2021, for JP Application No. 2018-144659.
The Extended European Search Report for European Patent Application No. 23151483.7 dated Jul. 31, 2023, pp. all.
Trial and Appeal Decision for the Japanese Patent Application No. 2018-144659 dated Jul. 3, 2023, pp. all.
Notice of Deficiencies for Israeli Patent Application No. 280567 dated Dec. 21, 2023, pp. all.

* cited by examiner

AIRTIGHT TERMINAL

CROSS REFERENCE TO RELATED APPLICATION(S)

This application is a U.S. National Stage filing under 35 U.S.C. § 371 of PCT Application No. PCT/JP2019/029798, filed Jul. 30, 2019, which claims priority to Japanese Application No. 2018-144659 filed Aug. 1, 2018, which applications are incorporated herein by reference in their entirety, for any purpose.

TECHNICAL FIELD

The present invention relates to an airtight terminal.

BACKGROUND ART

Packages for some electronic components such as quartz oscillators that are required to exhibit high airtightness use airtight terminals. A typical airtight terminal includes a metallic outer ring made of Kovar alloy, an iron-nickel alloy (alloy 42), steel, stainless steel, or another metal, leads made, similarly, of Kovar, insulating glass to seal gaps between the metallic outer ring and the respective leads, and an iron cap in which the metallic outer ring is press-fitted and fixed. A pair of through holes is formed in the metallic outer ring, with the leads passing through the through holes. The gaps between the respective leads and the metallic outer ring are hermetically sealed with the insulating glass. The leads and the metallic outer ring are electrically insulated from each other by the insulating glass.

Methods for sealing a can case with such a conventional airtight terminal are limited to resistance welding, laser welding, brazing, and cold press fitting and thus necessitate capital investment and running costs, as well as great expense. For instance, resistance welding requires increases in pressure and electric current with an increase in product size, thus resulting in high costs. In particular, the terminal and an end portion of the can body are under high temperature and pressure, albeit partially, during sealing. This creates the possibility of airtightness breakdown and performance degradation or destruction of a built-in device. Manufacturing of airtight terminals involves glass sealing at high temperatures. Consequently, the metallic outer ring of the conventional airtight terminal is composed of a metal sheet that is relatively thick, and the airtight terminals that are relatively large pose a problem in terms of components weight reduction.

A method described in Patent Literature 1 is an example of a conventional method for sealing a package with an airtight terminal. Patent Literature 1 discloses a technology for hermetically sealing a package for an aluminum electrolytic capacitor with an airtight terminal by cold press fitting the airtight terminal in a can case having a cap shape.

DOCUMENT LIST

Patent Literature
Patent Literature 1: International Publication No. WO 2016/195027

SUMMARY OF INVENTION

Technical Problem

An object of the present invention, accomplished to solve the problems described above, is to provide an airtight terminal designed to enable implementation of a method for sealing a can case with the airtight terminal with improved readiness and at a reasonable price, a package for an electrical device using the airtight terminal, and a method for manufacturing the electrical device package.

Solution to Problem

According to the present invention, an airtight terminal is provided that includes a lid composed of a dish-shaped thin metal sheet having a through hole in a surface of the sheet, a lead passing through the through hole in the lid, and an insulating material to hermetically seal a gap between the lead and the lid, wherein the lid has an engagement portion along an edge of the lid to seal a can case by seaming.

Further, the airtight terminal described above may be modified into an airtight terminal that includes a lid composed of a dish-shaped thin metal sheet having a through hole, a metallic ring inserted through the through hole in the lid and hermetically attached to the lid, a lead passing through the metallic ring, and an insulating material to hermetically seal a gap between the lead and the metallic ring, wherein the lid has an engagement portion along an edge of the lid to seal a can case by seaming.

The engagement portion described herein is a part that the lid has and that comes into contact with the can case to ensure stable support for contact places of the lid and the can case and thereby hermetically seal the edge of the lid of the airtight terminal and an edge of the can case that is an airtight container to which the airtight terminal is attached, by seaming.

For the airtight terminal of the present invention, the lead of the airtight terminal and a desired electrical device are electrically connected together first. After that, the external device is housed inside the can case for forming an airtight container, and the open edge of the can case and the engagement portion of the lid are brought together and hermetically sealed by seaming so that the electrical device is packaged. Preferably, the engagement portion provided for the lid is formed into a shape such that the lid and the can case are put in proper alignment when recessed and protruding parts of the lid and the can case engage with each other. For instance, it is preferred that a peripheral groove or a curl be formed around a peripheral edge of the lid by press working or other processing. In other words, the lid of the airtight terminal according to the present invention has an engagement portion that is formed into a desired shape such that the peripheral edge of the lid and the can case are readily fastened together by seaming. The engagement portion is an extended peripheral edge of the lid that constitutes a folding margin necessary for being fastened to the can case by seaming. The airtight terminal according to the present invention has either of the lid composed of a dish-shaped thin metal sheet and the lid composed of a dish-shaped thin metal sheet to which the additional metallic ring is hermetically attached. The airtight terminal is designed to hermetically seal an airtight container such as the can case readily by putting the lid on an opening of the airtight container and fastening edges of the lid and the airtight container together by seaming.

According to a second aspect of the present invention, provided is an electrical device package using the airtight terminal of the present invention, the electrical device package including: a lid composed of a dish-shaped thin metal sheet having a through hole in a surface of the sheet; a lead passing through the through hole in the lid; an insulating material to hermetically seal a gap between the lead and the lid; an electric element electrically connected to the lead; and a can case housing the electric element inside a container of the can case and being hermetically attached to the lid, in which the lid hermetically seals an open end of the can case by seaming along an edge of the lid.

Provided is another electrical device package using the airtight terminal of the present invention, the electrical device package including: a lid composed of a dish-shaped thin metal sheet having a through hole in a surface of the sheet; a metallic ring inserted through the through hole in the lid and hermetically attached to the lid; a lead passing through the metallic ring; an insulating material to hermetically seal a gap between the lead and the metallic ring; an electric element electrically connected to the lead; and a can case housing the electric element inside a container of the can case and being hermetically attached to the lid, in which the lid hermetically seals an open end of the can case by seaming along an edge of the lid.

According to a third aspect of the present invention, provided is a method for manufacturing an electrical device package including: a preparation step of preparing an airtight terminal of the present invention having an engagement portion configured to seal a can case by seaming, an electric element forming an electrical device, and the can case made up of a tubular container; an element connection step of electrically connecting and fixing the electric element to a lead of the airtight terminal; an element insertion and lid placement step of housing the electric element electrically connected to the airtight terminal inside the can case and putting and placing the airtight terminal on an open end portion of the can case; and a seam sealing step of hermetically sealing the can case by pressing the open end portion of the can case and the engagement portion of a lid of the airtight terminal each other while turning a seaming roll and swaging them together.

Effects of Invention

The present invention is intended to enable an airtight terminal to hermetically seal a tubular can case readily by providing a lid composed of a thin metal sheet for the airtight terminal, putting the lid on an opening of the tubular can case, and fastening edges of the lid and the tubular can case together by seaming. The technique of the present invention, unlike the conventional airtight terminal, eliminates the need for welding the airtight terminal and the airtight container together. During sealing, the airtight terminal is no longer exposed to heat and is not subject to great external force such as pressure compared to cold press fitting. This prevents performance degradation of container airtightness and a built-in device, as well as mechanical destruction. Further, the airtight terminal of the present invention enables hermetic sealing with improved readiness without using an expensive resistance welding machine or a laser welding machine. This helps simplify an assembly process for airtight packages, thus producing an economic effect. Moreover, a thin metal sheet can be applied to each of the lid and the can case of the present invention and this contributes to weight reduction of components.

DESCRIPTION OF EMBODIMENTS

An airtight terminal according to the present invention includes a lid composed of a dish-shaped thin metal sheet having at least one through hole, a lead passing through the through hole in the lid, and an insulating material to hermetically seal a gap between the lead and the lid, and the airtight terminal in which the lid has an engagement portion along an edge of the lid to seal a can case by seaming is provided.

The airtight terminal described above may be modified into an airtight terminal that includes a lid composed of a dish-shaped thin metal sheet having at least one through hole, a metallic ring inserted through the through hole in the lid and hermetically attached to the lid, a lead passing through the metallic ring, and an insulating material to hermetically seal a gap between the lead and the metallic ring, wherein the lid has an engagement portion along an edge of the lid to seal a can case by seaming.

The engagement portion of the airtight terminal according to the present invention is a part that the lid has and that comes into contact with the can case to ensure stable support for contact places of the lid and the can case and thereby hermetically seal the edge of the lid of the airtight terminal and an edge of the can case that is an airtight container to which the airtight terminal is attached, by seaming.

The airtight terminal of the present invention has the lid composed of a thin metal sheet hermetically attached to an outer periphery of the metallic ring of the airtight terminal and thus is able to hermetically seal an electronic or electrical device readily by putting the lid on an opening of a tubular can case or another airtight container and fastening edges of the lid and the tubular can case together by seaming. A coating of sealant may be applied to at least the engagement portion of the lid or at least a surface of the can case in contact with the engagement portion described above, the sealant being made of any of rubber, an elastomer, and a soft metal. The sealant may be applied to an entire surface of the lid or the can case or an entire surface inside the container.

Figure 1A:
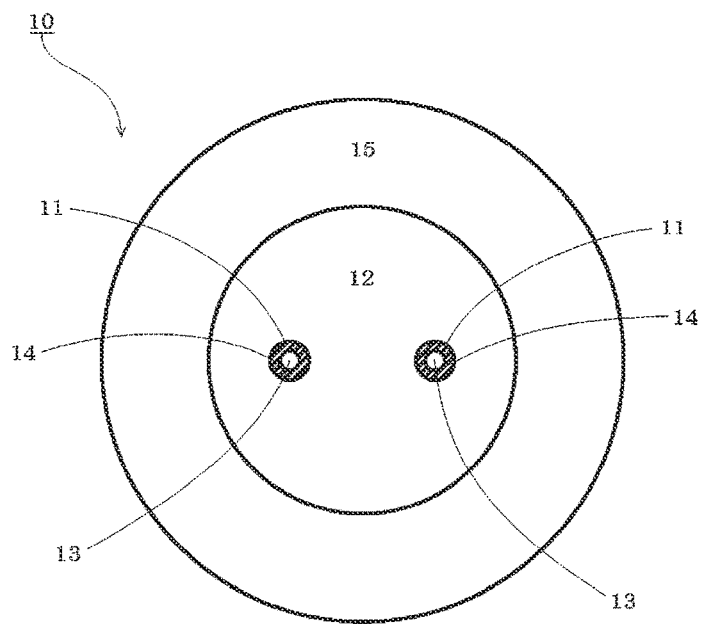
FIG. 1A A plan view illustrating an airtight terminal 10 according to the present invention FIG. 1B A cross-sectional elevation view illustrating an airtight terminal 10 according to the present invention FIG. 1C A bottom view illustrating an airtight terminal 10 according to the present invention FIG. 2A A plan view illustrating an airtight terminal 20 according to the present invention FIG. 2B A cross-sectional elevation view illustrating an airtight terminal 20 according to the present invention FIG. 2C A bottom view illustrating an airtight terminal 20 according to the present invention FIG. 3A A bottom view illustrating an electrical device package 30 according to the present invention FIG. 3B A cross-sectional elevation view illustrating an electrical device package according to the present invention FIG. 3C A bottom view illustrating an electrical device package 30 according to the present invention FIG. 4A A plan view illustrating an electrical device package 40 according to the present invention FIG. 4B A cross-sectional elevation view illustrating an electrical device package 40 according to the present invention FIG. 4C A bottom view illustrating an electrical device package 40 according to the present invention FIG. 5 A flowchart illustrating a method 50 for manufacturing an electrical device package according to the present invention
Figure 1B:
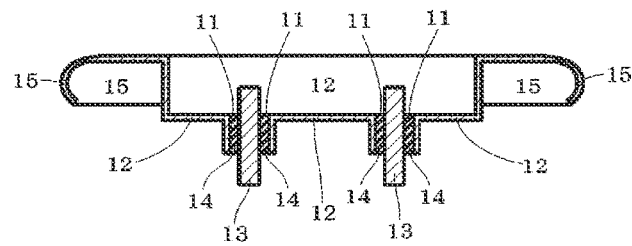
Figure 1C:
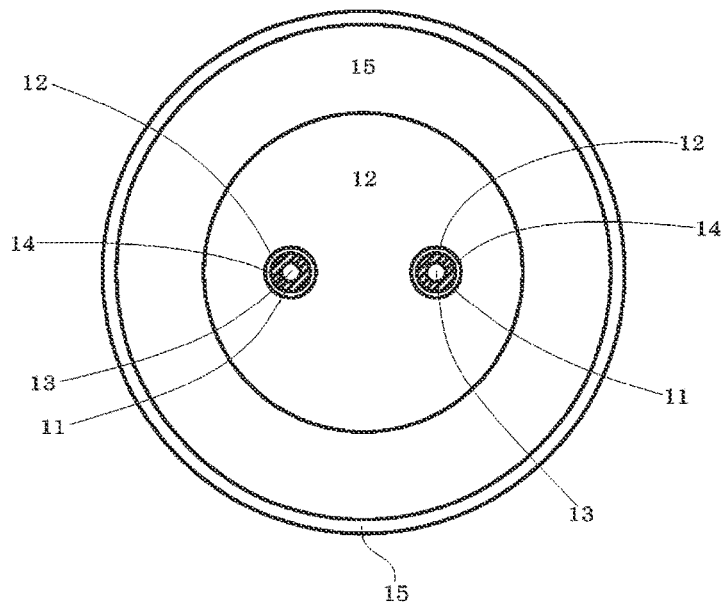

As illustrated in FIGS. 1A, 1B and 1C, an airtight terminal 10 according to the present invention is an airtight terminal that includes a lid 12 composed of a dish-shaped thin metal sheet having at least one through hole 11, a lead 13 passing through the through hole in the lid 12, and an insulating material 14 that is made of any one of glass, ceramics, and a plastic or a composite material made of a combination thereof to hermetically seal a gap between the lead 13 and the lid 12, wherein the lid 12 has an engagement portion 15 along an edge of the lid to seal a can case that the airtight terminal is attached to by seaming. A material that the lid 12 is made of is not particularly limited and may be any metallic material. Examples of the metallic material preferably include iron, copper, aluminum, iron-base alloys, copper alloys, and aluminum alloys. A surface of the metallic lid may be further provided with a corrosion-resistant film or a corrosion-proof film formed by metal plating or made of a polymer as needed.

Figure 2A:
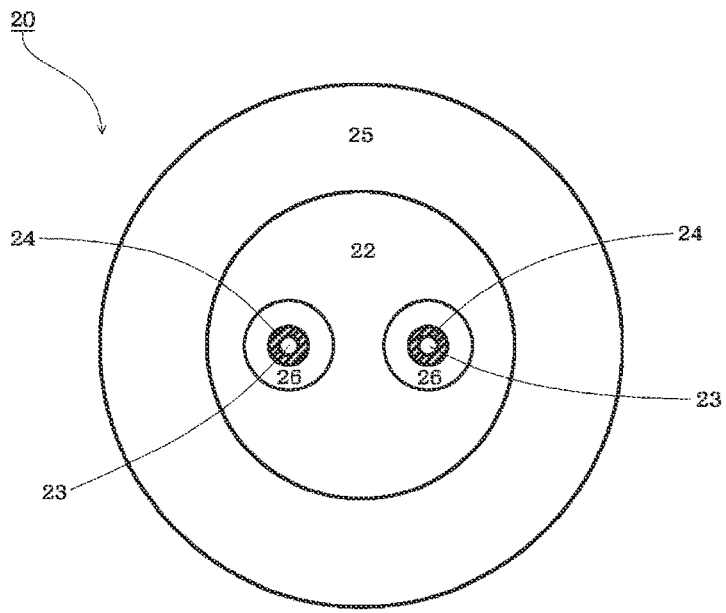
Figure 2B:
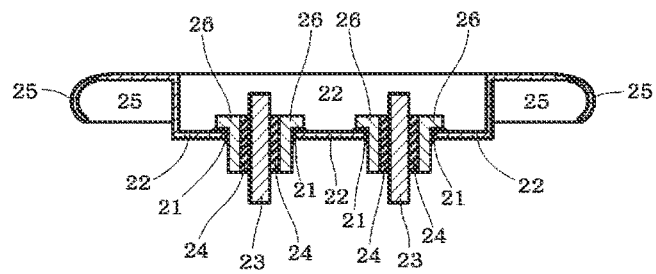
Figure 2C:
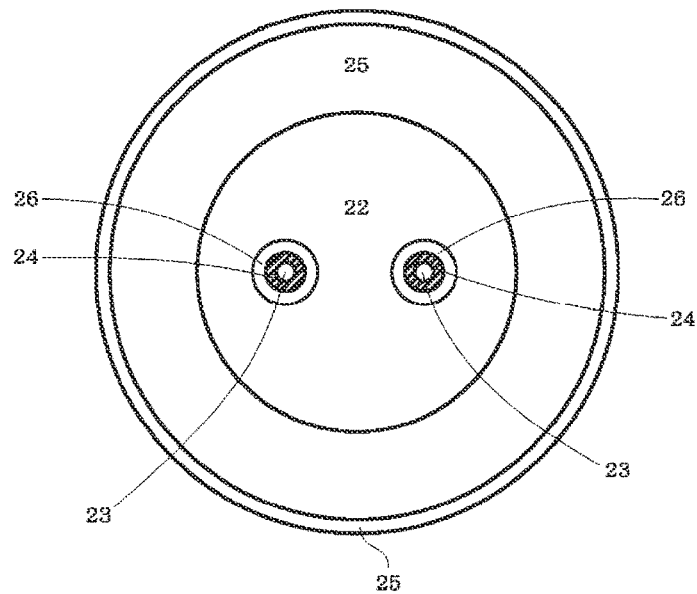

As illustrated in FIGS. 2A, 2B and 2C, an airtight terminal 20 according to the present invention is an airtight terminal that includes a lid 22 composed of a dish-shaped thin metal sheet having at least one through hole 21, a metallic ring 26 being inserted through the through hole 21 in the lid 22 and being hermetically fixed to the lid 22, a lead 23 passing through the metallic ring 26, and an insulating material 24 that is made of any one of glass, ceramics, and a plastic or a composite material made of a combination thereof to hermetically seal a gap between the lead 23 and the metallic ring 26, wherein the lid 22 has an engagement portion 25 along an edge of the lid to seal a can case that the airtight terminal is attached to by seaming. A material that the lid 22 and the metallic ring 26 are made of is not particularly limited and may be any metallic material. Examples of the metallic material preferably include iron, copper, aluminum, iron-base alloys, copper alloys, and aluminum alloys. A surface of the metallic material may be further provided with a corrosion-resistant film or a corrosion-proof film formed by metal plating or made of a polymer as needed.

The insulating material of the airtight terminal according to the present invention may be made of a composite material made up of different substances of glass, ceramics, and a plastic. The insulating material may be made of a composite material, for example, made up of phosphate glass of high-expansion low melting point glass with which a middle part of a sealing hole for the lead is sealed and an epoxy resin with which surfaces of the phosphate glass is completely covered near upper and lower openings of the sealing hole. The epoxy resin may be altered as appropriate by a glass material (e.g., waterproof glass) different from the phosphate glass or a ceramics material.

Figure 3A:
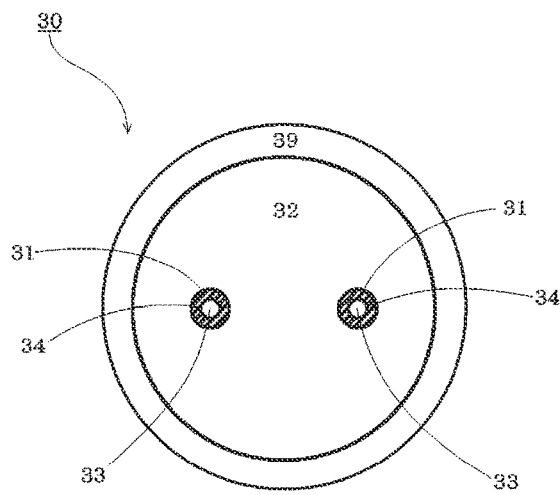
Figure 3B:
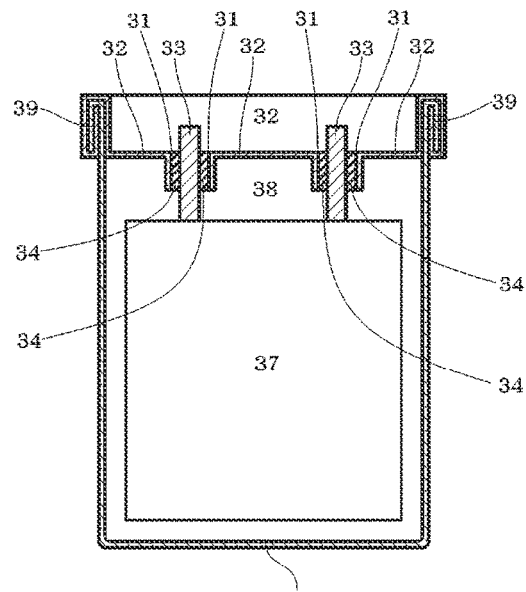
Figure 3C:
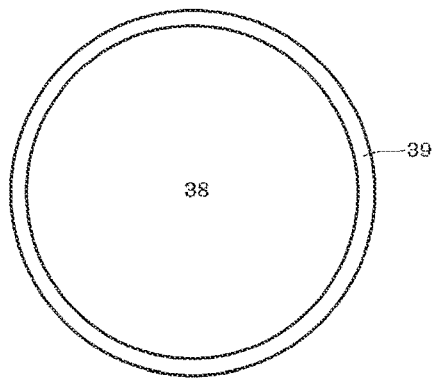

As illustrated in FIGS. 3A, 3B and 3C, an electrical device package 30 according to the present invention is an electrical device package using the airtight terminal 10 of the present invention, including a lid 32 composed of a dish-shaped thin metal sheet having at least one through hole 31, a lead 33 passing through the through hole 31 in the lid 32, an insulating material 34 that is made of any one of glass, ceramics, and a plastic or a composite material made of a combination thereof to hermetically seal a gap between the lead 33 and the lid 32, an electric element 37 electrically connected to the lead 33, and a can case 38 housing the electric element 37 inside a container of the can case and being hermetically attached to the lid 32, wherein a portion of the lid 32 along an edge of the lid hermetically seals an open end of the can case 38 by seaming 39.

Figure 4A:
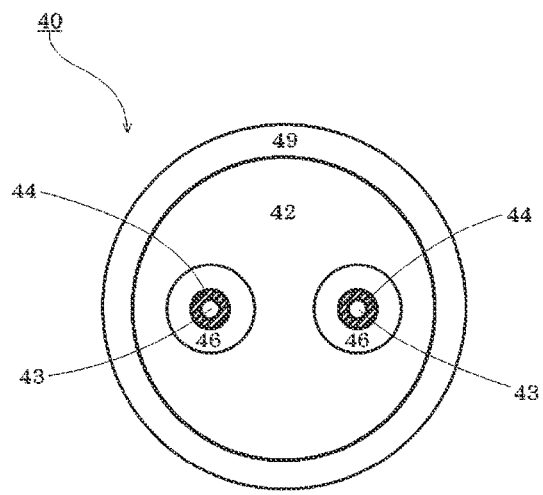
Figure 4B:
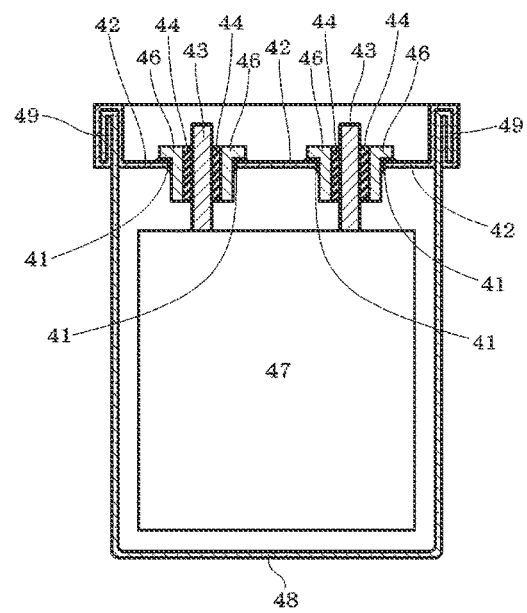
Figure 4C:
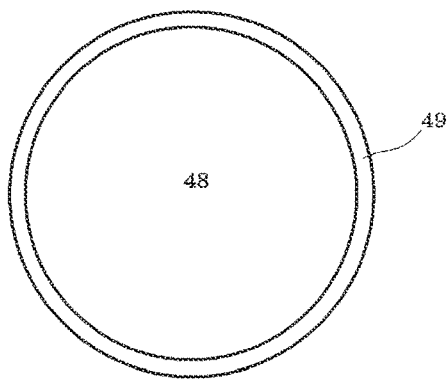

As illustrated in FIGS. 4A, 4B and 4C, an electrical device package 40 according to the present invention is an electrical device package using the airtight terminal 20 of the present invention, including a lid 42 composed of a dish-shaped thin metal sheet having at least one through hole 41, a metallic ring 46 being inserted through the through hole 41 in the lid 42 and being hermetically attached to the lid 42, a lead 43 passing through the metallic ring 46, an insulating material 44 that is made of any one of glass, ceramics, and a plastic or a composite material made of a combination thereof to hermetically seal a gap between the lead 43 and the metallic ring 46, an electric element 47 electrically connected to the lead 43, and a can case 48 housing the electric element 47 inside a container of the can case and being hermetically attached to the lid 42, wherein a portion of the lid 42 along an edge of the lid hermetically seals an open end of the can case 48 by seaming 49.

Figure 5:
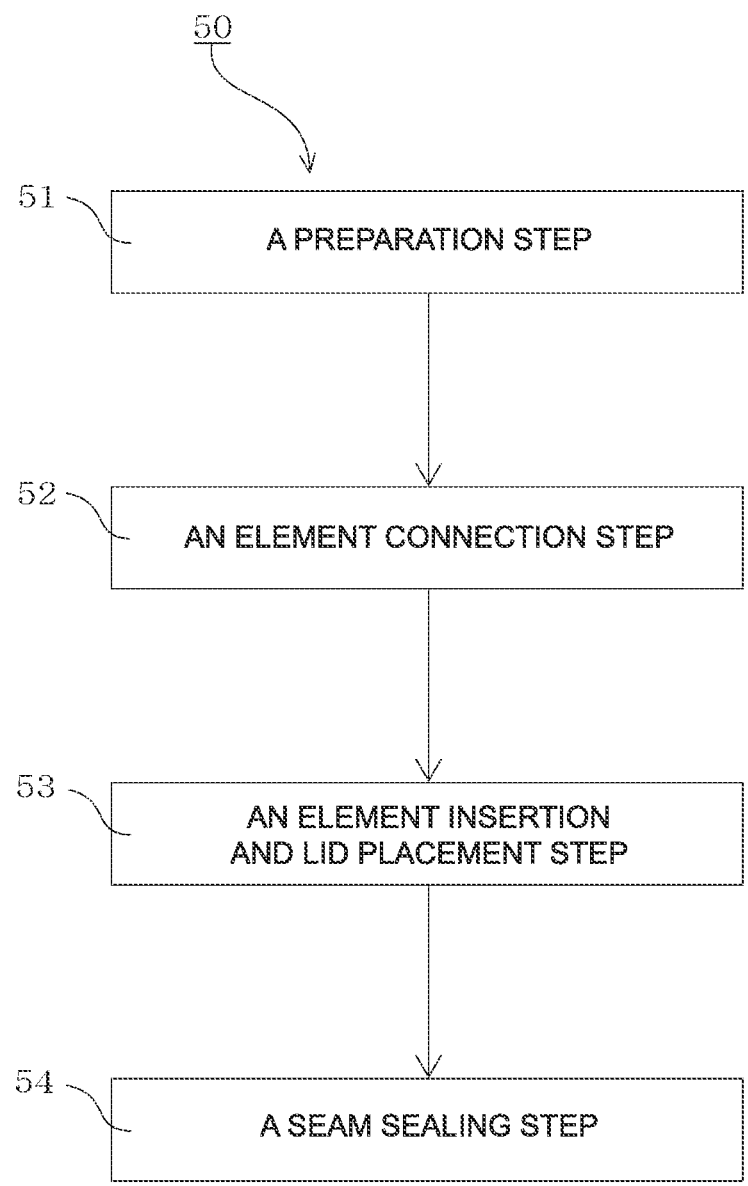

As illustrated in a flowchart of FIGS. 5A, 5B and 5C, a method 50 for manufacturing an electrical device package according to the present invention is a method for manufacturing an electrical device package using an airtight terminal of the present invention, the method including 1) a preparation step 51 to prepare the airtight terminal having an engagement portion configured to seal a can case by seaming, an electric element forming an electrical device, and the can case made up of a tubular container, 2) an element connection step 52 to electrically connect and fix the electric element to a lead of the airtight terminal, 3) an element insertion and lid placement step 53 to house the electric element electrically connected to the airtight terminal inside the can case and put and place the airtight terminal on an open end portion of the can case, and 4) a seam sealing step 54 to hermetically seal the can case by pressing and caulking the open end portion of the can case and the engagement portion provided with a peripheral groove or a curl that is formed around a peripheral edge of a lid of the airtight terminal by press working or other processing together while turning a seaming roll.

Although this specification illustrates airtight terminals each having two terminals, the airtight terminals can be applied to airtight terminals in any form insofar as they do not deviate from the gist of the present invention and the scope of the present invention should not be limited to the illustrated forms of the airtight terminals.

EXAMPLES

As illustrated in FIGS. 1A, 1B and 1C, an airtight terminal 10 of Example 1 according to the present invention includes a lid 12 composed of a dish-shaped thin metal sheet being made of aluminum and having two through holes 11 that are formed by extending places of a surface of the sheet tubularly and boring end faces of the places, leads 13 being made of aluminum and passing through the respective through holes 11 in the lid 12, and insulating materials 14 made of insulating glass to hermetically seal gaps between the respective leads 13 and the lid 12. The lid 12 has an engagement portion 15 composed of a curl along an edge of the lid to seal a can case by double seaming. For the airtight terminal 10 of the present invention, when the gaps between the lid 12 and the respective leads 13 are sealed directly with glass, sealed places of the lid 12 that are in contact with the insulating glass may be greater in thickness than the other sheet surface parts of the lid 12 in order for the sealed places to gain mechanical strength.

As illustrated in FIGS. 2A, 2B and 2C, an airtight terminal 20 of Example 2 according to the present invention includes a lid 22 composed of a dish-shaped thin metal sheet being made of aluminum and having two through holes 21, metallic rings 26 being made of an aluminum alloy, being inserted through the respective through holes 21 in the lid 22, and being hermetically fixed to the lid 22 with a silver brazing material, leads 23 passing through the respective metallic rings 26, and insulating materials 24 made of insulating glass to hermetically seal gaps between the leads 23 and the respective metallic rings 26. The lid 22 has an engagement portion 25 composed of a curl along an edge of the lid to seal a can case by double seaming. The airtight terminal 20 has the metallic rings 26 in order for places sealed with the insulating glass to gain mechanical strength. For instance, the metallic rings 26 may be made of a material identical to the material for the lid 22 and be made greater in thickness than the lid 22. Alternatively, the metallic rings 26 may be made of another material that is different from the material for the lid 22 and that is superior in mechanical strength to the lid 22.

The mechanical strength described in either instance above represents durability of a material required at the time of being sealed and during product use against external physical forces such as compression and tension and refers to strength of the material resistant to deformation and destruction.

As illustrated in FIGS. 3A, 3B and 3C, an electrical device package 30 of Example 3 according to the present invention is an electrical device package using the airtight terminal 10, including a lid 32 composed of a dish-shaped thin metal sheet being made of aluminum and having two through holes 31 that are formed by extending places of a surface of the sheet tubularly and boring end faces of the places, leads 33 being made of aluminum and passing through the respective through holes 31 in the lid 32, insulating materials 34 made of insulating glass to hermetically seal gaps between the respective leads 33 and the lid 32, an electric element 37 composed of an aluminum electrolytic capacitor element being electrically connected to inner sides of the leads 33 and containing an electrolytic solution, and a can case 38 being made of aluminum, having a cylindrical shape, housing the electric element 37 inside a container of the can case, and being hermetically attached to the lid 32. The lid 32 hermetically seals an open end of the can case 38 by double seaming 39 along an edge of the lid 32.

As illustrated in FIGS. 4A, 4B and 4C, an electrical device package 40 of Example 4 according to the present invention is an electrical device package using the airtight terminal 20, including a lid 42 composed of a dish-shaped thin metal sheet being made of aluminum and having two through holes 41, metallic rings 46 being made of an aluminum alloy, being inserted through the respective through holes in the lid 42, and being hermetically fixed to the lid 42 with a silver brazing material, leads 43 passing through the respective metallic rings 46, insulating materials 44 made of insulating glass to hermetically seal gaps between the leads 43 and the respective metallic rings 46, an electric element 47 composed of an aluminum electrolytic capacitor element being electrically connected to inner sides of the leads 43 and containing an electrolytic solution, and a can case 48 being made of aluminum, having a cylindrical shape, housing the electric element 47 inside a container of the can case, and being hermetically attached to the lid 42. The lid 42 hermetically seals an open end of the can case by double seaming 49 along an edge of the lid 42.

As illustrated in the flowchart of FIGS. 5A, 5B and 5C, a method 50 for manufacturing an electrical device package of Example 5 according to the present invention is a method for manufacturing an electrical device package using an airtight terminal of the present invention, the method including 1) a preparation step 51 of preparing the airtight terminal that includes a lid being made of aluminum and having an engagement portion formed into a curl along an edge of the lid, an aluminum electrolytic capacitor element, and a can case composed of a cylindrical container being made of aluminum and having an open end portion formed into a flange, 2) an element connection step 52 of electrically connecting and fix the aluminum electrolytic capacitor element containing an electrolytic solution to a lead of the airtight terminal, 3) an element insertion and lid placement step 53 of housing the aluminum electrolytic capacitor element electrically connected to the airtight terminal inside the can case and put and place the airtight terminal on the open end portion of the can case, and 4) a double seam sealing step 54 of hermetically sealing the can case by pressing and caulking the flange of the can case and the engagement portion provided with the curl that is formed around a peripheral edge of the lid of the airtight terminal by press working together while turning a seaming roll.

INDUSTRIAL APPLICABILITY

The present invention can be applied to airtight terminals and can, for example, be applied to an airtight terminal for an aluminum electrolytic capacitor.

LIST OF REFERENCE SIGNS

10, 20 airtight terminal,
11, 21, 31, 41 through hole,
12, 22, 32, 42 lid,
13, 23, 33, 43 lead,
14, 24, 34, 44 insulating material,
15, 25 engagement portion,
26, 46 metallic ring,
30, 40 electrical device package,
37, 47 electric element,
38, 48 can case,
39, 49 seaming,
50 method for manufacturing electrical device package,
51 preparation step,
52 element connection step,
53 element insertion and lid placement step,
54 seam sealing step

The invention claimed is:

1. An airtight terminal comprising:
   a lid to be attached to a can case, the lid being composed of a dish-shaped thin metal sheet having a through hole in the metal sheet;
   a lead passing through the through hole in the lid; and
   an insulating material configured to hermetically seal a gap between the lead and the lid in the through hole, wherein the lid has an engagement portion along an edge of the lid to seal a can case by seaming, wherein the engagement portion extends longer than the lead in a direction opposite to an attachment direction of lid to the can case.

2. The airtight terminal according to claim 1, wherein the engagement portion is formed into a shape such that the lid and the can case are put in proper alignment when recessed and protruding parts of the lid and the can case engage with each other.

3. The airtight terminal according to claim 1, wherein the engagement portion is composed of a peripheral groove or a curl.

4. The airtight terminal according to claim 1, wherein a coating of sealant is applied to at least the engagement portion of the lid.

5. The airtight terminal according to claim 4, wherein the sealant is made of any of rubber, an elastomer, and a soft metal.

6. The airtight terminal according to claim 1, wherein the lid is made of any of iron, aluminum, an iron-base alloy, and an aluminum alloy.

7. The airtight terminal according to claim 6, wherein a surface of the lid is provided with corrosion-resistant metal plating or a corrosion-proof film made of a polymer.

8. An airtight terminal comprising:
a lid to be attached to a can case, the lid being composed of a dish-shaped thin metal sheet having a through hole;
a metallic ring inserted through the through hole in the lid and hermetically attached to the lid;
a lead passing through the metallic ring; and
an insulating material configured to hermetically seal a gap between the lead and the metallic ring in the through hole,
wherein the lid has an engagement portion along an edge of the lid to seal a can case by seaming, and
wherein the engagement portion extends longer than the lead in a direction opposite to an attachment direction of lid to the can case.

9. The airtight terminal according to claim 8, wherein the engagement portion is formed into a shape such that the lid and the can case are put in proper alignment when recessed and protruding parts of the lid and the can case engage with each other.

10. The airtight terminal according to claim 8, wherein the engagement portion is composed of a peripheral groove or a curl.

11. The airtight terminal according to claim 8, wherein a coating of sealant is applied to at least the engagement portion of the lid.

12. The airtight terminal according to claim 11, wherein the sealant is made of any of rubber, an elastomer, and a soft metal.

13. The airtight terminal according to claim 8, wherein the lid is made of any of iron, aluminum, an iron-base alloy, and an aluminum alloy.

14. The airtight terminal according to claim 13, wherein a surface of the lid is provided with corrosion-resistant metal plating or a corrosion-proof film made of a polymer.

15. The airtight terminal according to claim 8, wherein a surface of the metallic ring is provided with corrosion-resistant metal plating or a corrosion-proof film made of a polymer.

16. The airtight terminal according to claim 8, wherein the metallic ring is made greater in thickness than the lid.

17. The airtight terminal according to claim 8, wherein the metallic ring is made of a metallic material identical to a metallic material for the lid.

18. The airtight terminal according to claim 8, wherein the metallic ring is made of a metallic material different from a metallic material for the lid.

19. An electrical device package comprising:
a lid composed of a dish-shaped thin metal sheet having a through hole in the metal sheet;
a lead passing through the through hole in the lid;
an insulating material configured to hermetically seal a gap between the lead and the lid in the through hole;
an electric element electrically connected to the lead; and
a can case housing the electric element inside a container of the can case and being hermetically attached to the lid,
wherein the lid has an engagement portion hermetically sealing an open end of the can case by seaming along an edge of the lid, and
wherein the engagement portion extends longer than the lead in a direction opposite to an attachment direction of lid to the can case.

20. The electrical device package according to claim 19, wherein the lid and the can case are hermetically sealed with a coating of sealant put between places of the lid and the can case sealed by seaming.

21. The electrical device package according to claim 20, wherein the sealant is made of any of rubber, an elastomer, and a soft metal.

22. The electrical device package according to claim 21, wherein the lid is made of any of iron, aluminum, an iron-base alloy, and an aluminum alloy.

23. The electrical device package according to claim 22, wherein a surface of the lid is provided with corrosion-resistant metal plating or a corrosion-proof film made of a polymer.

24. An electrical device package comprising:
a lid composed of a dish-shaped thin metal sheet having a through hole;
a metallic ring inserted through the through hole in the lid and hermetically attached to the lid;
a lead passing through the metallic ring;
an insulating material configured to hermetically seal a gap between the lead and the metallic ring in the through hole;
an electric element electrically connected to the lead; and
a can case housing the electric element inside a container of the can case and being hermetically attached to the lid, wherein the lid has an engagement portion hermetically sealing an open end of the can case by seaming along an edge of the lid, and
wherein the engagement portion extends longer than the lead in a direction opposite to an attachment direction of lid to the can case.

25. The electrical device package according to claim 24, wherein the lid and the can case are hermetically sealed with a coating of sealant put between places of the lid and the can case sealed by seaming.

26. The electrical device package according to claim 25, wherein the sealant is made of any of rubber, an elastomer, and a soft metal.

27. The electrical device package according to claim 24, wherein the lid is made of any of iron, aluminum, an iron-base alloy, and an aluminum alloy.

28. The electrical device package according to claim 27, wherein a surface of the lid is provided with corrosion-resistant metal plating or a corrosion-proof film made of a polymer.

29. The electrical device package according to claim 24, wherein a surface of the metallic ring is provided with corrosion-resistant metal plating or a corrosion-proof film made of a polymer.

30. The electrical device package according to claim 24, wherein a thickness of the metallic ring is greater than the lid.

31. The electrical device package according to claim 24, wherein the metallic ring is made of a metallic material identical to a metallic material for the lid.

32. The electrical device package according to claim 24, wherein the metallic ring is made of a metallic material different from a metallic material for the lid.

33. A method for manufacturing an electrical device package comprising:

a preparation step of preparing an airtight terminal having an engagement portion configured to seal a can case by seaming, an electric element forming an electrical device, and the can case made up of a tubular container;

an element connection step of electrically connecting and fixing the electric element to a lead of the airtight terminal;

an element insertion and lid placement step of housing the electric element electrically connected to the airtight terminal inside the can case and putting and placing the airtight terminal on an opening of the can case;

a seam sealing step of hermetically sealing the can case by pressing an open end portion of the can case and the engagement portion of a lid of the airtight terminal each other while turning a seaming roll and swaging them together, wherein the lid is composed of a dish-shaped thin metal sheet; and forming a through hole in the lid by extending places of a surface of the metal sheet tubularly and boring end faces of the places, wherein the engagement portion extends longer than the lead in a direction opposite to an attachment direction of lid to the can case.

34. The method for manufacturing the electrical device package according to claim 33, wherein the engagement portion is formed into a shape such that the lid and the can case are put in proper alignment when recessed and protruding parts of the lid and the can case engage with each other.

35. The method for manufacturing the electrical device package according to claim 33, wherein the engagement portion is composed of a peripheral groove or a curl.

36. The method for manufacturing the electrical device package according to claim 33, wherein the open end portion is formed into a flange.

* * * * *